US009852039B1

(12) United States Patent
Goldin et al.

(10) Patent No.: US 9,852,039 B1
(45) Date of Patent: Dec. 26, 2017

(54) PHASE LOCKED LOOP (PLL) TIMING DEVICE EVALUATION SYSTEM AND METHOD FOR EVALUATING PLL TIMING DEVICES

(71) Applicant: Integrated Device Technology, Inc., San Jose, CA (US)

(72) Inventors: Leon Goldin, Otttawa (CA); Silvana Rodrigues, Ottawa (CA)

(73) Assignee: INTEGRATED DEVICE TECHNOLOGY, INC, San Jose, CA (US)

( * ) Notice: Subject to any disclaimer, the term of this patent is extended or adjusted under 35 U.S.C. 154(b) by 133 days.

(21) Appl. No.: 15/015,094

(22) Filed: Feb. 3, 2016

(51) Int. Cl.
  *G06F 11/00* (2006.01)
  *G06F 11/26* (2006.01)
  *G06F 11/22* (2006.01)
  *G06F 11/273* (2006.01)

(52) U.S. Cl.
  CPC ........ *G06F 11/261* (2013.01); *G06F 11/2205* (2013.01); *G06F 11/273* (2013.01)

(58) Field of Classification Search
  CPC .. G06F 11/2205; G06F 11/261; G06F 11/273; H04B 17/0087; G01R 31/31725; G01R 31/31726; G01R 31/31937
  See application file for complete search history.

(56) References Cited

U.S. PATENT DOCUMENTS

| | | | |
|---|---|---|---|
| 4,684,941 A | 8/1987 | Smith et al. | |
| 4,862,485 A | 8/1989 | Guinea et al. | |
| 5,388,060 A * | 2/1995 | Adams, Jr. ............ | G06F 11/261 703/27 |
| 5,663,105 A | 9/1997 | Yu et al. | |
| 5,748,949 A | 5/1998 | Johnston et al. | |
| 5,757,240 A | 5/1998 | Boerstler et al. | |
| 5,848,355 A | 12/1998 | Rasor et al. | |
| 5,903,195 A | 5/1999 | Lukes et al. | |
| 6,219,797 B1 | 4/2001 | Liu et al. | |
| 6,259,327 B1 | 7/2001 | Balistreri et al. | |
| 6,640,311 B1 | 10/2003 | Knowles et al. | |

(Continued)

OTHER PUBLICATIONS

"19-Output PCIE Gen 3 Buffer", Si53019-A01A, Silicon Laboratories Inc., Rev. 1.1 May 2015, 34 Pages.

(Continued)

*Primary Examiner* — Marc Duncan
(74) *Attorney, Agent, or Firm* — Glass & Associates; Kenneth Glass

(57) ABSTRACT

An evaluation board and a method for evaluating Phase Locked Loop (PLL) timing devices. The evaluation board includes an input and output circuit disposed on a circuit board along with control logic, and a plurality of PLL-timed physical devices that are identical to the physical devices used in the customer's communication system. A first connector receptacle and a second connector receptacle are coupled to the control logic and to one or more of the PLL-timed physical devices, and are configured to receive a PLL card including a PLL timing device. A third connector receptacle is coupled in series between the first connector receptacle and the second connector receptacle and is configured to receive a backplane emulator card having electrical characteristics emulating a backplane of the customer's communication system.

20 Claims, 6 Drawing Sheets

(56) References Cited

U.S. PATENT DOCUMENTS

| | | | |
|---|---|---|---|
| 6,643,787 B1 | 11/2003 | Zerbe et al. | |
| 6,650,193 B2 | 11/2003 | Endo et al. | |
| 6,683,506 B2 | 1/2004 | Ye et al. | |
| 6,727,767 B2 | 4/2004 | Takada et al. | |
| 6,768,387 B1 | 7/2004 | Masuda et al. | |
| 6,870,411 B2 | 3/2005 | Shibahara et al. | |
| 6,959,066 B2 | 10/2005 | Wang et al. | |
| 7,012,476 B2 | 3/2006 | Ogiso et al. | |
| 7,323,916 B1 | 1/2008 | Sidiropoulos et al. | |
| 7,405,594 B1 | 7/2008 | Xu et al. | |
| 7,434,083 B1 | 10/2008 | Wilson et al. | |
| 7,541,848 B1 | 6/2009 | Masuda et al. | |
| 7,545,188 B1 | 6/2009 | Xu et al. | |
| 7,573,303 B1 | 8/2009 | Chi et al. | |
| 7,586,347 B1 | 9/2009 | Ren et al. | |
| 7,590,163 B1 | 9/2009 | Miller et al. | |
| 7,671,635 B2 | 3/2010 | Fan et al. | |
| 7,714,565 B2* | 5/2010 | Abuhamdeh | G01R 31/31725 324/76.53 |
| 7,737,739 B1 | 6/2010 | Bi et al. | |
| 7,741,981 B1 | 6/2010 | Wan et al. | |
| 7,750,618 B1 | 7/2010 | Fang et al. | |
| 7,756,197 B1* | 7/2010 | Ferguson | H04L 1/24 375/224 |
| 7,786,763 B1 | 8/2010 | Bal et al. | |
| 7,800,422 B2 | 9/2010 | Lee et al. | |
| 7,816,959 B1 | 10/2010 | Isik et al. | |
| 7,882,404 B2* | 2/2011 | Dai | H04L 25/0264 714/716 |
| 7,907,625 B1 | 3/2011 | MacAdam et al. | |
| 7,928,880 B2 | 4/2011 | Tsukamoto | |
| 7,941,723 B1 | 5/2011 | Lien et al. | |
| 8,010,072 B1 | 8/2011 | Nathawad | |
| 8,018,289 B1 | 9/2011 | Hu et al. | |
| 8,164,367 B1 | 4/2012 | Bal et al. | |
| 8,179,952 B2 | 5/2012 | Thurston et al. | |
| 8,188,796 B2 | 5/2012 | Zhu et al. | |
| 8,259,888 B2 | 9/2012 | Hua et al. | |
| 8,284,816 B1 | 10/2012 | Clementi et al. | |
| 8,305,154 B1 | 11/2012 | Kubena et al. | |
| 8,416,107 B1 | 4/2013 | Wan et al. | |
| 8,432,231 B2 | 4/2013 | Nelson et al. | |
| 8,436,677 B2 | 5/2013 | Kull et al. | |
| 8,456,155 B2 | 6/2013 | Tamura et al. | |
| 8,471,751 B2 | 6/2013 | Wang | |
| 8,537,952 B1 | 9/2013 | Arora et al. | |
| 8,693,557 B1 | 4/2014 | Zhang et al. | |
| 8,704,564 B2 | 4/2014 | Hasegawa et al. | |
| 8,723,573 B1 | 5/2014 | Wang et al. | |
| 8,791,763 B2 | 7/2014 | Taghivand | |
| 8,896,476 B2 | 11/2014 | Harpe | |
| 8,933,830 B1 | 1/2015 | Jeon | |
| 8,981,858 B1 | 3/2015 | Grivna et al. | |
| 9,077,386 B1 | 7/2015 | Holden et al. | |
| 9,100,232 B1 | 8/2015 | Hormati et al. | |
| 9,112,517 B1 | 8/2015 | Lye et al. | |
| 9,455,854 B2 | 9/2016 | Gao | |
| 9,479,182 B1 | 10/2016 | Staicu et al. | |
| 2002/0079937 A1 | 6/2002 | Xanthopoulos et al. | |
| 2002/0191727 A1 | 12/2002 | Staszewski et al. | |
| 2003/0042985 A1 | 3/2003 | Shibahara et al. | |
| 2003/0184350 A1 | 10/2003 | Wang et al. | |
| 2004/0136440 A1 | 7/2004 | Miyata et al. | |
| 2004/0165691 A1 | 8/2004 | Rana et al. | |
| 2005/0170787 A1 | 8/2005 | Yamamoto et al. | |
| 2006/0103436 A1 | 5/2006 | Saitou et al. | |
| 2006/0119402 A1 | 6/2006 | Thomsen et al. | |
| 2006/0197614 A1 | 9/2006 | Roubadia et al. | |
| 2006/0229018 A1* | 10/2006 | Mlinarsky | H04B 17/0087 455/67.11 |
| 2006/0290391 A1 | 12/2006 | Leung et al. | |
| 2007/0149144 A1 | 6/2007 | Beyer et al. | |
| 2007/0247248 A1 | 10/2007 | Kobayashi et al. | |
| 2008/0043893 A1 | 2/2008 | Nagaraj et al. | |
| 2008/0104435 A1 | 5/2008 | Pernia et al. | |
| 2008/0129351 A1 | 6/2008 | Chawla et al. | |
| 2008/0246546 A1 | 10/2008 | Ha et al. | |
| 2009/0083567 A1 | 3/2009 | Kim et al. | |
| 2009/0128242 A1 | 5/2009 | Fitzgibbon et al. | |
| 2009/0140896 A1 | 6/2009 | Adduci et al. | |
| 2009/0153252 A1 | 6/2009 | Chen et al. | |
| 2009/0184857 A1 | 7/2009 | Furuta et al. | |
| 2009/0231901 A1 | 9/2009 | Kim et al. | |
| 2009/0256601 A1 | 10/2009 | Zhang et al. | |
| 2009/0262567 A1 | 10/2009 | Shin et al. | |
| 2010/0007427 A1 | 1/2010 | Tomita et al. | |
| 2010/0052798 A1 | 3/2010 | Hirai et al. | |
| 2010/0090731 A1 | 4/2010 | Casagrande et al. | |
| 2010/0109714 A1 | 5/2010 | Lindfors et al. | |
| 2010/0164761 A1 | 7/2010 | Wan et al. | |
| 2010/0194483 A1 | 8/2010 | Storaska et al. | |
| 2010/0240323 A1 | 9/2010 | Qiao et al. | |
| 2010/0323643 A1 | 12/2010 | Ridgers et al. | |
| 2011/0006936 A1 | 1/2011 | Lin et al. | |
| 2011/0032013 A1 | 2/2011 | Nelson et al. | |
| 2011/0095784 A1 | 4/2011 | Behel et al. | |
| 2011/0234204 A1 | 9/2011 | Tamura et al. | |
| 2011/0234433 A1 | 9/2011 | Aruga et al. | |
| 2011/0264435 A1* | 10/2011 | Jamnejad | G06F 11/261 703/28 |
| 2011/0285575 A1 | 11/2011 | Landez et al. | |
| 2011/0304490 A1 | 12/2011 | Janakiraman | |
| 2012/0013406 A1 | 1/2012 | Zhu et al. | |
| 2012/0043999 A1 | 2/2012 | Quevy et al. | |
| 2012/0161829 A1 | 6/2012 | Fernald et al. | |
| 2012/0200330 A1 | 8/2012 | Kawagoe et al. | |
| 2012/0249207 A1 | 10/2012 | Natsume et al. | |
| 2012/0262315 A1 | 10/2012 | Kapusta et al. | |
| 2012/0293221 A1 | 11/2012 | Ma et al. | |
| 2012/0297231 A1 | 11/2012 | Qawami et al. | |
| 2012/0317365 A1 | 12/2012 | Elhamias et al. | |
| 2012/0328052 A1 | 12/2012 | Etemadi et al. | |
| 2013/0002467 A1 | 1/2013 | Wang | |
| 2013/0162454 A1 | 6/2013 | Lin | |
| 2013/0194115 A1 | 8/2013 | Wu et al. | |
| 2013/0211758 A1 | 8/2013 | Prathapan et al. | |
| 2013/0300455 A1 | 11/2013 | Thirugnanam et al. | |
| 2014/0021990 A1 | 1/2014 | Na et al. | |
| 2014/0029646 A1 | 1/2014 | Foxcroft et al. | |
| 2014/0210532 A1 | 7/2014 | Jenkins et al. | |
| 2014/0327478 A1 | 11/2014 | Horng et al. | |
| 2014/0347941 A1 | 11/2014 | Jose et al. | |
| 2015/0028960 A1 | 1/2015 | Yorita | |
| 2015/0162921 A1 | 6/2015 | Chen et al. | |
| 2015/0180594 A1 | 6/2015 | Chakraborty et al. | |
| 2015/0200649 A1 | 7/2015 | Trager et al. | |
| 2015/0213873 A1 | 7/2015 | Ihm et al. | |
| 2016/0013796 A1 | 1/2016 | Choi | |
| 2016/0084895 A1 | 3/2016 | Imhof | |
| 2016/0119118 A1 | 4/2016 | Shokrollahi | |
| 2016/0162426 A1 | 6/2016 | Benjamin et al. | |
| 2016/0211929 A1 | 7/2016 | Holden et al. | |

OTHER PUBLICATIONS

"NB3W1200L: 3.3 V 100/133 MHz Differential 1:12 Push-Pull Clock ZDB/Fanout Buffer for PCIe", ON Semiconductor, http://onsemi.com, Aug. 2013, Rev. 0, 26 Pages.

Avramov, et al., "1.5-GHz Voltage Controlled Oscillator with 3% Tuning Bandwidth Using a Two-Pole DSBAR Filter", Ultrasonics, Ferroelectrics and Frequency Control. IEEE Transactions on. vol. 58., May 2011, pp. 916-923.

Hwang, et al., "A Digitally Controlled Phase-Locked Loop with a Digital Ohase—Frequency Detector for Fast Acquisition", IEEE Journal of Solid State Circuits, vol. 36, No. 10, Oct. 2001, pp. 1574-1581.

Kratyuk, et al., "Frequency Detector for Fast Frequency Lock of Digital PLLs", Electronic Letters, vol. 43, No. 1, Jan. 4, 2007, pp. 1-2.

Mansuri, "Fast Frequency Acquisition Phase-Frequency Detectors for GSamples/s Phase-Locked Loops", IEEE Journal of Solid-State Circuits, vol. 37 No. 10, Oct. 2002, pp. 1331-1334.

(56) References Cited

OTHER PUBLICATIONS

Nagaraju, "A Low Noise 1.5GHz VCO with a 3.75% Tuning Range Using Coupled FBAR's", IEEE International Ultrasonics Symposium (IUS), Oct. 2012, pp. 1-4.

Watanabe, "An All-Digital PLL for Frequency Multilication by 4 to 1022 with Seven-Cycle Lock Time", IEEE Journal of Solid-State Circuits, vol. 39 No. 2, Feb. 2003, pp. 198-204.

Texas Instruments "CDCEx913 Programmable 1-PLL VCXO Clock Synthesizer With 1.8-V, 2.5-V, and 3.3-V Outputs", Apr. 2015, pp. 1-36, pp. 11, 20-22.

\* cited by examiner

PHASE LOCKED LOOP (PLL) TIMING DEVICE EVALUATION SYSTEM AND METHOD FOR EVALUATING PLL TIMING DEVICES

BACKGROUND OF THE INVENTION

Phase locked loops are used in a wide range of applications such as clock generation, clock alignment, deskewing, jitter reduction, clock distribution, frequency synthesis, etc. Communication systems often include multiple cards such as timing cards and line cards that are connected together by a backplane bus. Each timing card and line card typically includes at least one Phase Locked Loop (PLL) timing device.

It is difficult for vendors of PLL timing devices to demonstrate that their PLL timing devices will work well in systems that include multiple PLL timing devices such as systems that include timing cards and line cards. Product demonstration for these systems is usually performed using an evaluation board that only includes a single timing device. Though it is sometimes possible to connect the single PLL timing device to the customer's communication system to allow the customer to evaluate the operation of the PLL timing device in the customer's system, the process of connecting the evaluation board to the customer's system is difficult and time consuming. Often it is not even possible, depending on the characteristics of the customer's system.

Even if connection to the customer's system is achieved, connecting an evaluation board having a single PLL timing device does not allow for evaluation of complex systems that include multiple PLL timing devices. Furthermore, to evaluate the effect of using different PLL-timed physical devices such as different Ethernet PLL-timed physical devices requires the use of a customer system that includes the different Ethernet PLL-timed physical device. Accordingly there is a need for a method and apparatus that will allow for the evaluation of multi-card communication systems that include more than one PLL timing device.

SUMMARY

A method for evaluating PLL timing devices is disclosed that includes providing an evaluation board including PLL-timed physical device, an input and output circuit, connector receptacles and control logic of a communication system that is being emulated. Phase locked loop cards are provided that are configured to be inserted into the connector receptacles, each of the phase locked loop cards including a phase locked loop timing device. One or more backplane emulator card is provided that is configured to be inserted into one of the connector receptacles. The backplane emulator card has electrical characteristics emulating a portion of the communication system extending between phase locked loop timing devices of the communication system. Different phase locked loop cards and different backplane emulator cards can be coupled to the connector receptacles to emulate different configurations of the communication system.

An evaluation board is disclosed that includes a circuit board, an input and output circuit, and control logic coupled to the input and output circuit, the control logic including one or more physical device that is the same type of physical device in an emulated communication system. The evaluation board also includes a plurality of PLL-timed physical devices, where some of the PLL-timed physical devices are the same type of physical devices in the emulated computer system. Each of the plurality of PLL-timed physical devices are coupled to the control logic and to the input and output circuit. A first PLL connector receptacle is disposed on the circuit board and coupled to the control logic and to one or more of the PLL-timed physical devices, the first PLL connector receptacle configured to receive a PLL card including a PLL timing device. A second PLL connector receptacle is disposed on the circuit board and coupled to the control logic and to one or more of the PLL-timed physical devices, the second PLL connector receptacle configured to receive a PLL card including a PLL timing device. A backplane emulator connector receptacle is coupled in series between the first connector receptacle and to the second connector receptacle and is configured to receive a backplane emulator card having electrical characteristics emulating a backplane of the emulated communication system.

A system for evaluating PLL devices is disclosed that includes a circuit board, an input and output circuit disposed on the circuit board and control logic coupled to the input and output circuit. The control logic includes one or more physical device that is the same type of physical device in an emulated communication system. The system includes a plurality of PLL-timed physical devices, where some of the PLL-timed physical devices are the same type of physical devices in the emulated computer system. Each of the PLL-timed physical devices are coupled to the control logic and to the input and output circuit. A first connector receptacle is disposed on the circuit board and coupled to the control logic and to one or more of the PLL-timed physical devices. A second connector receptacle disposed on the circuit board and coupled to the control logic and to one or more of the PLL-timed physical devices.

The system further includes a plurality of phase locked loop (PLL) cards, each of the PLL cards including a PLL timing device that can be used in the emulated communication system and including a card connector configured to be coupled to the first connector receptacle and the second connector receptacle. A third connector receptacle is coupled in series between the first connector receptacle and to the second connector receptacle. The system further includes a backplane emulator card including a connector configured to be coupled to the third connector receptacle. The backplane emulator card has electrical characteristics emulating a backplane of the emulated communication system. Different PLL cards can be coupled to the first connector receptacle and to the second connector receptacle and the backplane emulator card can be inserted into the third connector receptacle for evaluating different configurations of the emulated communication system.

Accordingly, the method and apparatus of the present invention allow for the evaluation communication systems that include more than one PLL timing device. Moreover, the PLL timing devices can be simultaneously evaluated in an environment that closely emulates the customer's communication system. Thereby, an evaluation can be performed more easily than evaluations that are performed using a prior art evaluation board that only allows for the evaluation of a single PLL.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Figure 1:
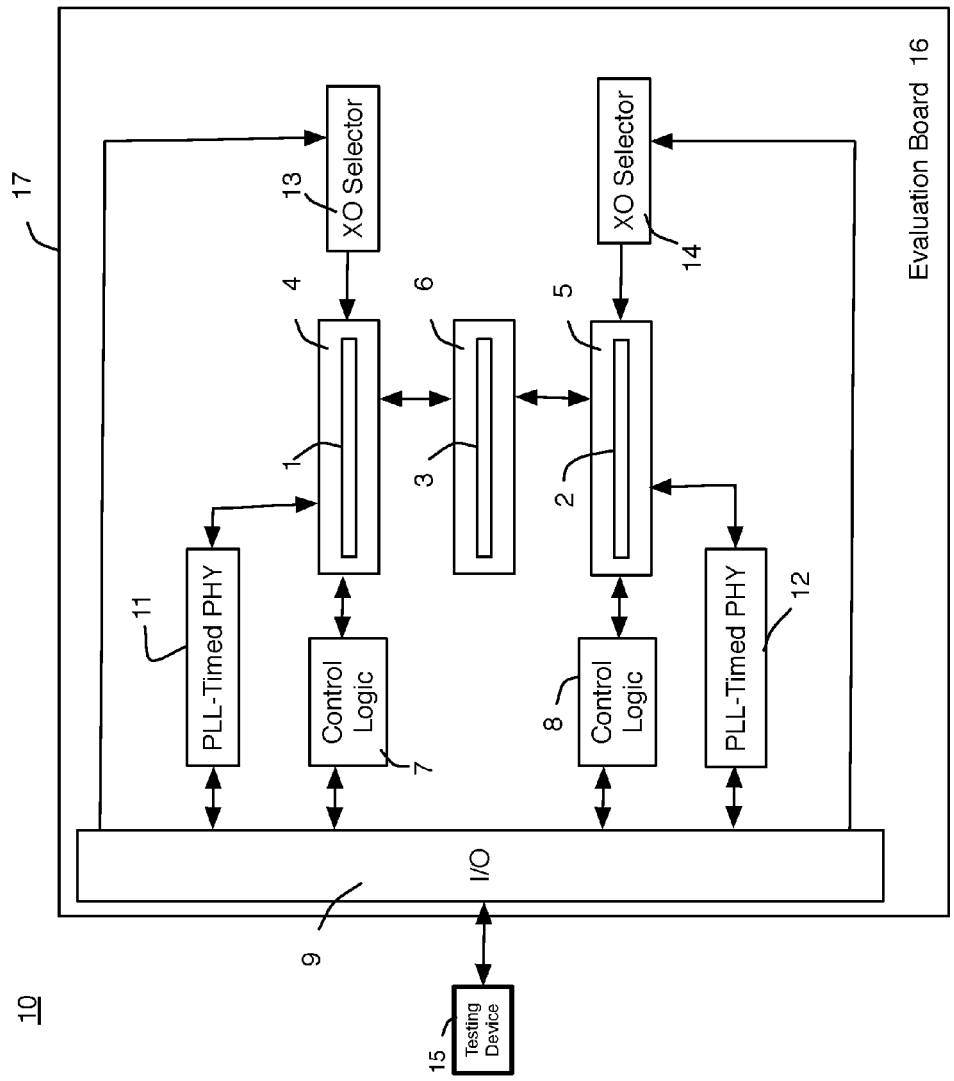
FIG. 1 illustrates an evaluation system, according to embodiments of the invention.

FIG. 1 illustrates an evaluation system 10 for evaluating multiple PLL timing devices of a communication system. The evaluation system 10 includes an evaluation board 16 and a testing device 15 that is electrically coupled to the evaluation board 16. Evaluation board 16 includes an input and output circuit 9 that is disposed on a circuit board 12. Input and output circuit 9 is configured to couple input and output between the circuitry of evaluation board 16 and external circuitry such as testing device 15. Control logic 7-8 is disposed on circuit board 17 and is electrically coupled to input and output circuit 9. A first connector receptacle 4, that may be referred to as a "PLL connector receptacle," is disposed on circuit board 12 and is electrically coupled to control logic 7. A second connector receptacle 5, that may be referred to as a "PLL connector receptacle," is disposed on circuit board 17 and is electrically coupled to control logic 8. A third connector receptacle 6, that may be referred to as a "Backplane Emulator (BE) connector receptacle," is coupled in series between PLL connector receptacle 4 and PLL connector receptacle 5.

System 10 includes at least two Phase Locked Loop (PLL) cards 1-2 and one or more backplane emulator card 3 that are coupled to evaluation board 16. A plurality of PLL-timed physical devices, such as exemplary PLL-timed physical devices 11-12 are disposed on evaluation board 16 and are electrically coupled to input and output circuit 9. PLL-timed physical device 11 is electrically connected to PLL connector receptacle 4 and is timed by the circuitry of the PLL card 1 installed in PLL connector receptacle 4. PLL-timed physical device 12 is electrically connected to PLL connector receptacle 5 and is timed by the circuitry of the PLL card 2 installed in PLL connector receptacle 5.

In embodiments of the present invention control logic 7 includes one or more additional PLL-timed physical device that is timed by the circuitry of the PLL card 1 installed in PLL connector receptacle 4 and control logic 8 includes one or more additional PLL-timed physical device that is timed by the circuitry of the PLL card 2 installed in PLL connector receptacle 5.

Oscillator input selector 13 is disposed on circuit board 17 and is electrically connected to input and output circuit 9 and to connector receptacle 4 for coupling external reference clock signals to the circuitry of the PLL installed in PLL connector receptacle 4; and oscillator input selector 14 is disposed on circuit board 17 and is electrically connected to input and output circuit 9 for coupling external reference clock signals to the circuitry of the PLL installed in PLL connector receptacle 5.

Figure 2:
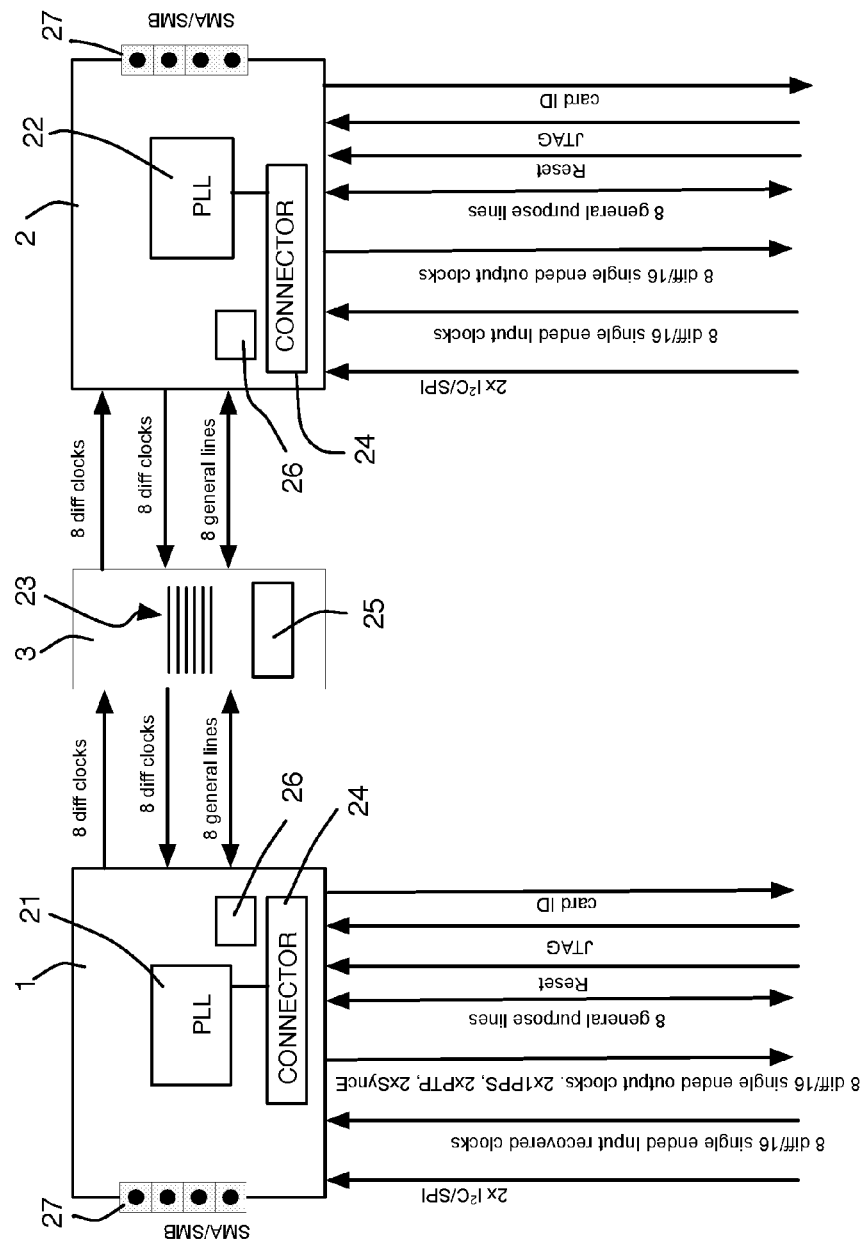
FIG. 2 illustrates two PLL cards and a backplane emulator card, according to embodiments of the invention.

Referring now to FIG. 2, each PLL card 1-2 includes a phase locked loop (PLL) timing device 21-22 and includes a connector 24 configured to be coupled to connector receptacles 4-5. In the present embodiment the connector 24 is a conventional card-edge connector that includes electrical contacts disposed on an edge of each PLL card 1-2 that are configured to mate with corresponding electrical contacts of connector receptacles 4-5 for electrically coupling PLL timing devices 21-22 to the other circuitry of evaluation board 16.

In one embodiment, in addition to a PLL timing device 21-22, other circuitry 26 is included on each PLL card 1-2 such as, for example power filtering circuitry, Light Emitting Diodes (LEDs), Electrically Erasable Programmable Read-Only Memory (EEPROM) and clock buffers. In one embodiment each PLL card 1-2 includes connector receptacles 27 that are electrically connected to PLL timing device 21-22 for coupling PLL timing devices 21-22 directly to external circuitry (e.g., by electrical cable) that can be, for example, eight system management bus accelerator (SMA) jacks for system management bus (SMB) inputs and outputs.

Clock output from PLL timing device 21 is sent through PLL connector receptacle 4 to PLL-timed PHY 11 so as to provide timing input to PLL-timed PHY 11 for timing of PLL-timed PHY 11. Clock output from PLL timing device 22 is sent through PLL connector receptacle 5 to PLL-timed PHY 12 so as to provide timing input to PLL-timed PHY 12 for timing of PLL-timed PHY 12. The term PLL-timed physical device, as used in the present invention, refers to any semiconductor device that is clocked by a PLL timing device, and specifically includes those semiconductor devices that are clocked by a PLL timing device 21-22 that is inserted into one of PLL connector receptacles 4-5. In the present embodiment each of PLL-timed physical devices 11-12 are semiconductor die or packaged semiconductor die that form one or more integrated circuit device, including individually packaged semiconductor die and multi-chip modules. These integrated circuit devices may be Application Specific Integrated Circuit (ASIC) devices, or programmable logic devices such as Field Programmable Gate Array (FPGA) devices.

Backplane emulator card 3 includes a backplane emulator circuit 23 and a connector 25 configured to be coupled to connector receptacles 6. In the present embodiment the connector 25 is a conventional card-edge connector that includes electrical contacts disposed on an edge of backplane emulator card 3 that are configured to mate with corresponding electrical contacts of connector receptacle 6 for electrically coupling backplane emulator circuit 23 to the other circuitry of evaluation board 16.

Clock input and output from PLL timing device 21 couples to corresponding clock input and output of PLL timing device 22 through backplane emulator card 3. In addition, eight general purpose lines from PLL timing device 21 couple to corresponding general purpose lines of PLL timing device 22 through backplane emulator card 3. In this embodiment, electrical traces that extend from connector receptacle 4 to connector receptacle 6 couple clock input and output (e.g., 8 differential or 16 single ended clocks) and the eight general purpose lines between connector receptacle 4 and connector receptacle 6. Electrical traces that extend from connector receptacle 5 to connector receptacle 6 couple clock input and output (e.g., 8 differential or 16 single ended clocks) and the eight general purpose lines between connector receptacle 5 and connector receptacle 6. It can be seen that, in this embodiment connector receptacle 6 only connects to connector receptacles 4 and 5 and is not directly connected to any other circuitry of evaluation board 16.

In the present embodiment two Inter-Integrated Circuit ($I^2C$)/Serial Parallel Interface (SPI) bus inputs, 8 differential or 16 single ended input recovered clocks, a reset input and a Joint Test Action Group (JTAG) input couple to PLL timing device 21 and 8 differential or 16 single ended output clocks and a card ID output are coupled from PLL timing device 21 to the circuitry of evaluation board 16. In addition, eight general-purpose lines couple PLL timing device 21 to the circuitry of evaluation board 16. In this embodiment two $I^2C$/SPI inputs, 8 differential or 16 single ended input recovered clocks, a reset input and a JTAG input couple to PLL timing device 22 and 8 differential or 16 single ended output clocks and a card ID output are coupled from PLL timing device 22 to the circuitry of evaluation board 16. In addition, eight general-purpose lines couple PLL timing device 22 to the circuitry of evaluation board 16. In one embodiment the eight general-purpose lines are used for EEPROM programming, changing operating mode and changing loading mode.

Backplane emulator card 3 has electrical characteristics emulating a portion of the communication system extending between phase locked loop timing devices of the communication system being emulated. In the present embodiment backplane emulator circuit 23 consists only of electrical traces that couple connections from PLL card 1 to corresponding connections of PLL card 2. In embodiments of the present invention backplane emulator circuit 23 emulates a backplane timing bus of a communication system for transmitting voice, data and video over a Carrier network.

Evaluation system 10 may also include PLL-clocked physical devices in addition to PLL-clocked physical devices 11-12 that are shown in FIGS. 1-4 such as one or more FPGA devices or ASIC devices. In one embodiment control logic 7 includes a PLL-clocked physical device that is a FPGA device that is clocked by the PLL card 1 installed in connector receptacle 4; and control logic 8 includes a PLL-clocked physical device that is a FPGA device that is clocked by the PLL card 2 installed in connector receptacle 5.

Evaluation system 10 may also include additional PLL-clocked physical devices that are ASIC devices. In one embodiment control logic 7 includes a PLL-clocked physical device that is a ASIC device that is clocked by the PLL card 1 installed in connector receptacle 4; and control logic 8 includes a PLL-clocked physical device that is a ASIC device that is clocked by the PLL card 2 installed in connector receptacle 5. These ASIC devices may be, for example, T1/E1 transceivers, routers, multi-service switching platform transceivers, Passive Optic Network (PON) devices, Digital Subscriber Line Access Multiplexer (DSLAM) devices, Bluetooth (IEEE 802.15) devices, Ethernet (IEEE 802.3 standard) devices, Universal Serial bus (USB) devices, High Definition Multimedia Interface (HDMI) devices, IEEE 1394 (Firewire) devices, etc. These examples are provided merely for illustration and are not meant to limit application of embodiments of the present invention. Furthermore, FPGA's of control logic 7-8 may include transceivers for transmitting and receiving data using any of the above-listed formats and standards.

In one embodiment control logic 7 and control logic 8 can include a PLL-clocked physical devices that is the same type of FPGA or that are different FPGAs (e.g., a different manufacturer, type of device, model or part number, etc.) so as to allow for the demonstration and testing of different FPGA devices. Alternatively the FPGA devices in control logic 7-8 are identical physical devices having different programmable logic configurations.

In the present embodiment system 10 includes Ethernet logic, including Ethernet logic within each PLL-timed PHY 11-12 and Ethernet logic within control logic 7 and control logic 8. In one such embodiment PLL-timed PHY 11-12 are Ethernet devices such as Ethernet switches, control logic 7 includes a FPGA that includes an Ethernet transceiver and Ethernet logic, and control logic 7 includes a FPGA that includes an Ethernet transceiver and Ethernet logic.

In one embodiment control logic 7 includes a first FPGA device and control logic 8 includes a second FPGA device that each include control logic in conformance with the IEEE 1588 specification, Version 2, by the Institute for Electrical and Electronics Engineers (IEEE) for operation as IEEE 1588 timing devices. In one embodiment PLL timing devices 21-22 generate clock output (e.g., 1PPS and either ITU-T G.8263 or ITU-T G.8273.2 clock output) that is coupled to the IEEE 1588 control logic 7-8 such that the IEEE 1588 control logic 7 and IEEE 1588 control logic 8 operate as IEEE 1588 clocks. In one embodiment one or more of IEEE 1588 control logic devices 7-8 also includes logic coupled to serial interfaces that generate Digitally Controlled Oscillator (DCO) or phase control signals that are coupled to one or more of PLL timing devices 21-22 for controlling the output of PLL timing devices 21-22.

In one embodiment PLL-timed PHYs 11-12 are synchronous Ethernet (SynchE) and IEEE 1588 capable devices that conform to the ITU-T G.8262 and ITU-T G.8273.2 specification by the International Telecommunication Union, Geneva, Switzerland. In this embodiment control logic 7-8 provides the message protocol of the network to control and monitor clock synchronization and in the present embodiment the protocol for these messages complies with the ITU-T G.8264 standard. In one embodiment control logic 7-8 includes one or more FPGA that is used in conjunction with a PLL timing device 21-22 that can be a Synchronous Equipment Timing Source (SETS) for 1G, 10G, 40G, or 100G SynchE. The SETS device acts as an Ethernet Equipment Clock source for the FPGA, and performs clock cleanup, advanced clock monitoring, and switchover functions.

Different PLL cards 1-2 can be inserted into PLL connector receptacles 4-5 and different backplane emulator cards 3 can be inserted into backplane emulator connector receptacle 6 for evaluating different possible configurations of the communication system that is being emulated. Also, PLL cards 1-2 can be switched from one of PLL connector receptacles 4-5 to the other of PLL connector receptacles 4-5 for evaluation of different PLL-timed PHY 11-12.

Furthermore, evaluation system 10 allows for a customer's actual backplane to be easily coupled between PLL timing devices using electrical cables that connect to the customer's actual backplane. This can be done by electrically coupling electrical cables (e.g., copper cables) to the customer's backplane and inserting plugs of the electrical cable into connector receptacles 27 on PLL cards 1-2.

Accordingly evaluation system 10 allows for demonstration of complex PLL timing devices using a single evaluation board.

Figure 3:
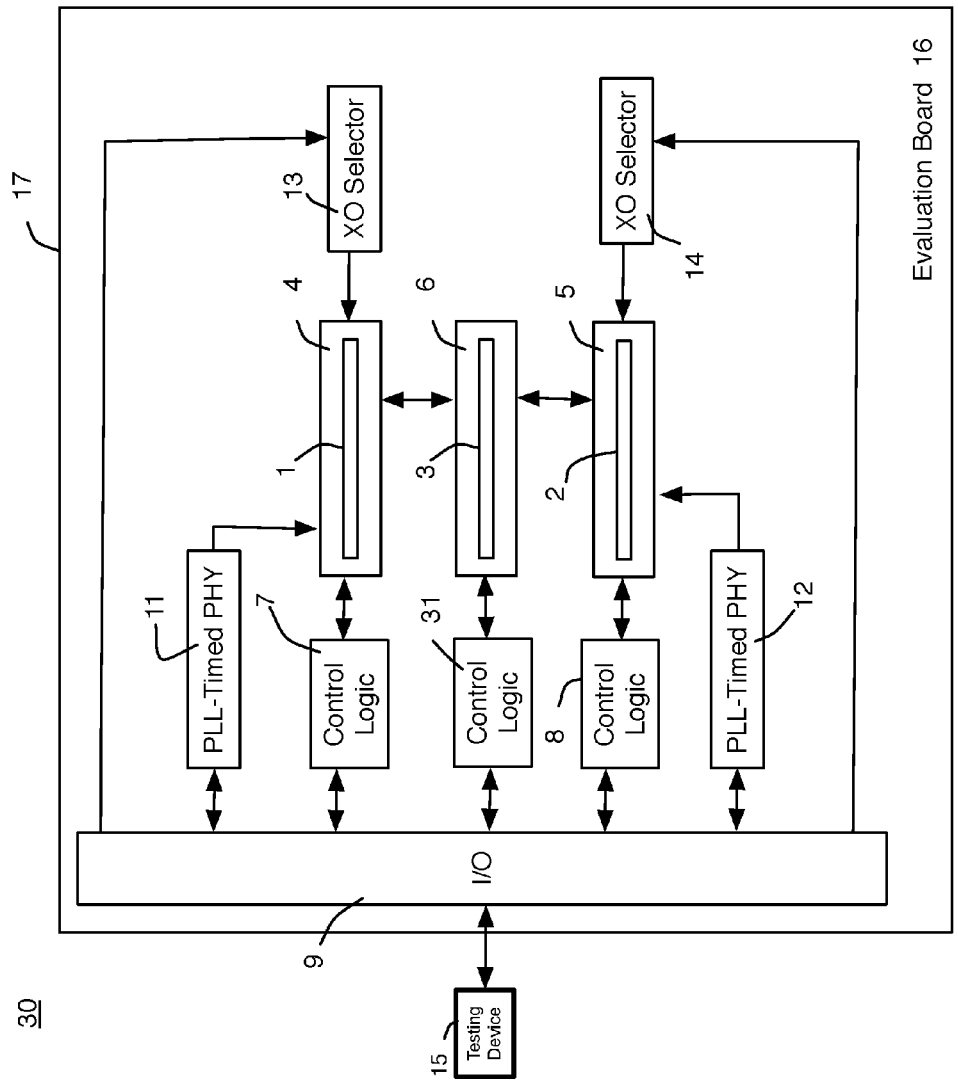
FIG. 3 illustrates an evaluation system that includes control logic that connects to the backplane emulator card, according to embodiments of the invention.
Figure 4:
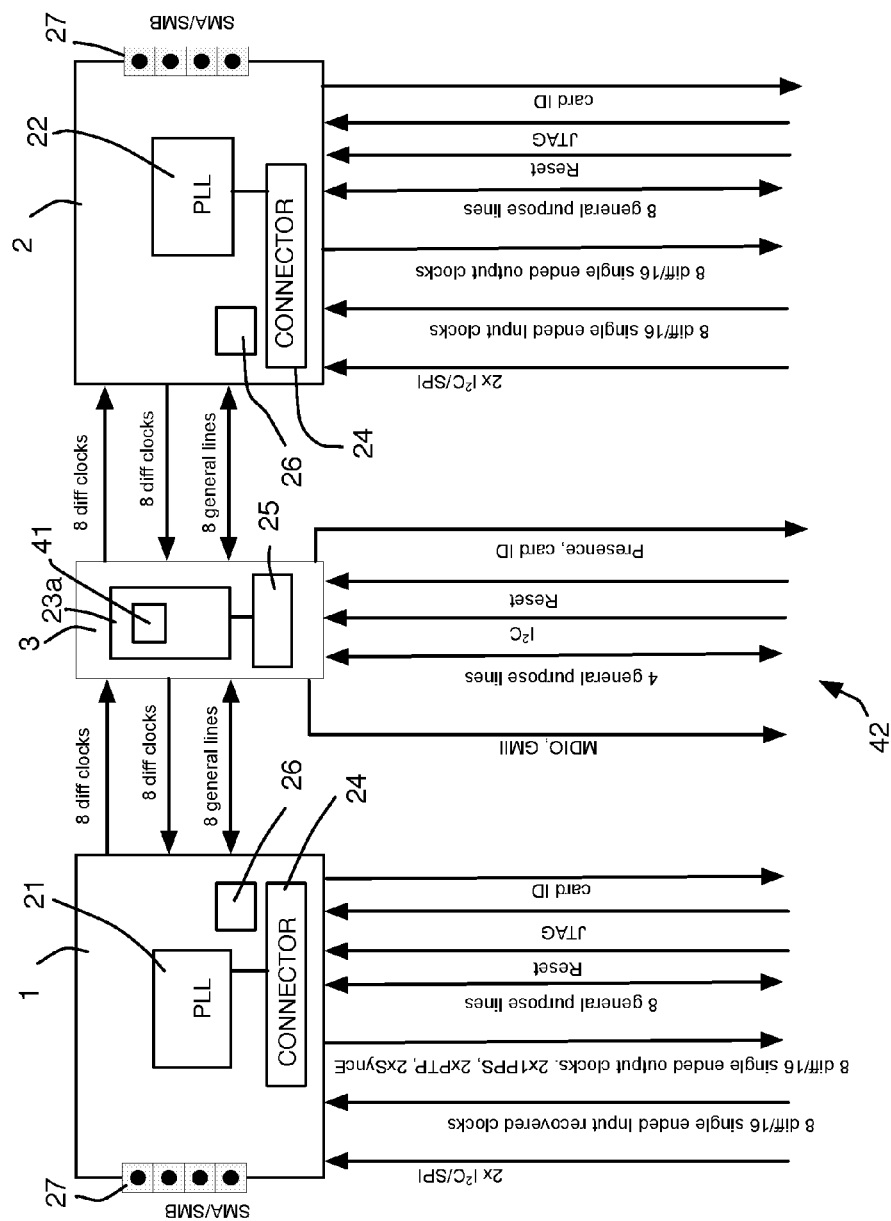
FIG. 4 illustrates two PLL cards and a backplane emulator card that includes a backplane emulator circuit that can be configured to vary the electrical characteristics of the backplane emulator circuit, according to embodiments of the invention.

In the embodiment shown in FIGS. 3-4 emulation circuit 23a includes circuitry that can be configured through control logic 31 for varying the electrical characteristics (e.g., the resistance) between the connections that go to PLL connector 4 and the connections that go to PLL 5. Thereby, different backplane configurations can be achieved using a single backplane emulator card, without the need to change to a different backplane emulator card to emulate a particular backplane.

Referring now to FIG. 4, emulation circuit 23a includes selection circuitry 41 that allows for selecting different electrical characteristics between connections from PLL card 1 to corresponding connections of PLL card 2. In one embodiment the selection circuitry includes a plurality of switches that are coupled between connections from PLL card 1 to corresponding connections of PLL card 2. Each switch is coupled to two or more different electrical traces (e.g., electrical traces having a different length) that can be selected to choose a particular trace length corresponding to the characteristics of the customer's communication system. In one embodiment control logic 31 of FIG. 3 couples Management Data Input/Output (MDIO), Gigabit Media Independent Interface (GMII), four general purpose lines, I$^2$C, Reset, Presence and card ID input and output, to emulation circuit 23a. Control logic 31 provides input to the switches to select the traces having the desired electrical characteristics (e.g., the desired length or resistance) corresponding to the characteristics of the customer's communication system.

In an alternate embodiment emulation circuit 23a of FIG. 4 includes a variable delay circuit coupled between each input or output of PLL 1 and the corresponding input or output of PLL 2. The variable delay circuit is electrically connected to selection circuitry 41 for controlling the delay between each input or output of PLL 1 and the corresponding input or output of PLL 2. In this embodiment control circuitry 41 includes one or more ASIC that is coupled to the selection circuitry and that is operable to control the delay provided by the delay circuit. In embodiments of the present invention control logic 31 is control logic within a FPGA that is operable to control selection circuitry 41. The delay circuit may have any of a number of different configurations known in the art to provide variable delay, such as, for example, a buffer chain having a length that is controlled by I$^2$C input.

In yet another embodiment, emulation circuit 23a of FIG. 4 includes a plurality of different line drivers coupled between each input or output of PLL 1 and the corresponding input or output of PLL 2. The line drivers are electrically connected to selection circuitry 41 that is operable for selecting which line driver is coupled between each input or output of PLL 1 and the corresponding input or output of PLL 2. In this embodiment control logic 31 provides input to the selection circuitry 41 for selecting the line driver to be coupled between each input or output of PLL 1 and the corresponding input or output of PLL 2.

In one exemplary embodiment, configurable emulation circuit 23a may include a first line driver and a second line driver coupled in parallel between one or more of the connection between PLL card 1 and PLL card 2 and may include a switch operable to select either the first line driver or the second line driver. Thereby, either the first line driver or the second line driver is coupled between each connection to PLL card 1 and the corresponding connection to PLL card 2. The first line driver and the second line driver are different line drivers and have different electrical characteristics, allowing for quickly and easily selecting electrical characteristics corresponding to different customer backplanes.

Figure 5:
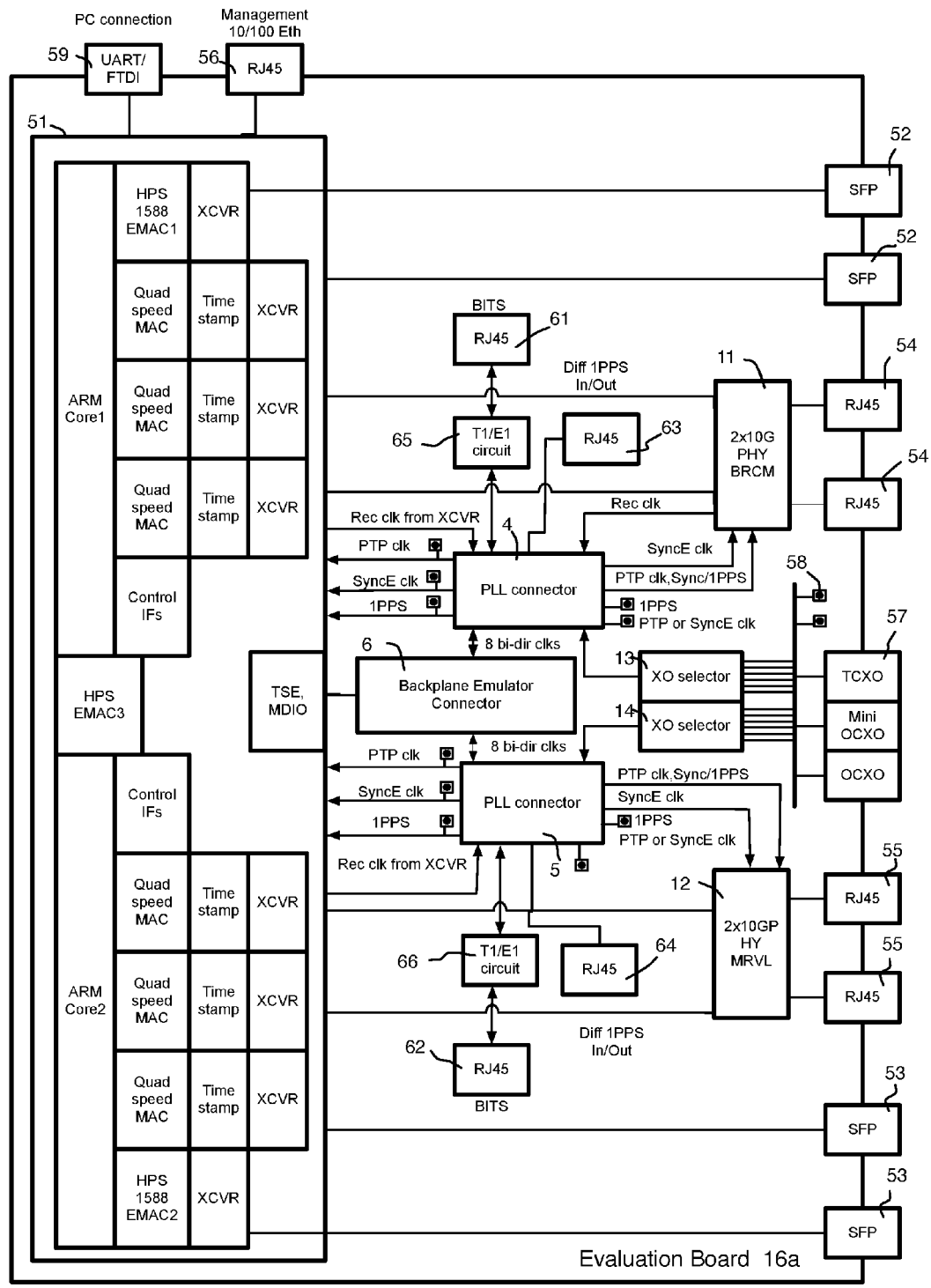
FIG. 5 illustrates an evaluation board that includes a single programmable logic device, according to embodiments of the invention.

In one embodiment that is shown in FIG. 5, control logic 7-8 and 31 includes a single FPGA having two ARM cores and associated logic, with a first processing core (ARM Core 1) for controlling the operation of the PLL card 1-2 inserted in PLL connector receptacle 4 and a second processing core (ARM Core 2) and associated logic for controlling the operation of the PLL card 1-2 inserted in PLL connector receptacle 5. The input and output circuitry includes Small Form-factor Pluggable (SFP) sockets 52 that are electrically connected to FPGA 51, oscillator input connector receptacles 57 that are electrically coupled to oscillator input selectors 13-14 (e.g., by a clock input bus) and Ethernet connector receptacles 54-55 that couple to PLL-timed PHYs 11-12, jacks 58 (connector receptacles), Ethernet connector receptacle 56 that connects to FPGA 51 and Universal Asynchronous Receiver Transmitter (UART)/FTD connector receptacle 59 that is electrically connected to FPGA 21.

UART/FTD connector receptacle 21 and Ethernet connector receptacle 56 can connect to an external computing device (PC) or other circuitry of testing device 15 for providing input and output between FPGA 51 and testing device 15.

In the present embodiment SFP sockets 52 are electrically coupled to ARM Core 1 and the circuitry of FPGA 51 associated with ARM core 1; and SFP sockets 53 are electrically coupled to ARM core 2 and the circuitry of FPGA 51 associated with ARM core 2. FPGA 51 includes Triple Speed Ethernet (TSE) Management Data Input/Output (MDIO) transceiver circuitry electrically connected to backplane emulator connector 6 for controlling configurable backplane emulation circuits 23a. Thereby, a backplane emulator card 3 that includes a configurable emulation circuit 23a can be inserted and the electrical characteristics of the backplane emulation circuit 23a can be changed through TSE/MDIO circuitry of FPGA 51.

Evaluation board 16a of FIG. 5 includes an exemplary PLL-timed PHY 11 that is a Gigabit Ethernet switch (e.g., a 2×10G Ethernet switch by Broadcom, Inc. of Irvine, Calif.) that couples to external devices through Ethernet connector receptacles 54 and an exemplary PLL-timed PHY 12 that is a Gigabit Ethernet switch (e.g., a 2×10G Ethernet switch by Marvell Semiconductor, Inc. of Santa Clara, Calif.) that couples to external devices through Ethernet connector receptacles 55. PLL connector receptacle 4 connects to PLL-timed PHY 11 so as to provide a PTP clock, synchronous Ethernet (SynchE clk) clock, and 1 PPS clock output to PLL-timed PHY 5 and receive a recovered clock signal (Rec_clk) from PLL-timed PHY 5. PLL connector receptacle 5 connects to PLL-timed PHY 12 so as to provide PTP clock, synchronous Ethernet (SynchE clk) clock, and 1 PPS clock output to PLL-timed PHY 12 and receive a recovered clock signal (REC_Clk) from PLL-timed PHY 12. FPGA 51 connects to PLL-timed PHY 11 and to PLL-timed PHY 12 and may include a differential 1 PPS input and output signal. PLL-timed PHYs 11-12 can be configured as both SynchE nodes and IEEE 1588 boundary clocks for demonstration of operation of the PLL timing devices installed in PLL connector receptacles 4-5.

A first T1/E1 circuit 65 is coupled between PLL connector 4 and connector receptacle 61 to provide T1 and or E1 input and output to the PLL card coupled to PLL connector receptacle 4. A second T1/E1 circuit 66 is coupled between PLL connector receptacle 5 and connector receptacle 62 to provide T1 and or E1 input and output to the PLL card coupled to PLL connector receptacle 5. In the present embodiment T1/E1 circuits 65-55 are individual ASIC devices that provide for T1 and/or E1 signal processing. RJ45 connector receptacle 63 directly connects to PLL connector receptacle 4 to couple differential 1PPS input and output between external test circuitry and the PLL card 1-2 inserted in PLL connector receptacle 4. Connector receptacle 64 directly connects to PLL connector receptacle 5 to couple differential 1PPS input and output between external test circuitry and the PLL card 1-2 inserted in PLL connector receptacle 5.

Oscillator input connector receptacles 57, which may include one or more temperature compensated crystal oscillator (TCXO) input, one or more mini oven-controlled crystal oscillator (OXCO) input and one or more OXCO input that are electrically coupled to oscillator input selectors 13-14. Oscillator selector 13 is electrically connected to PLL connector receptacle 4 and may be controlled (e.g., by input to jack 58) for selecting an input clock signal to be provided to PLL connector receptacle 4. Oscillator input selector 14 is electrically connected to PLL connector receptacle 5 and may be controlled (e.g., by input to jack 58) for selecting an input clock signal to be provided to PLL connector receptacle 5. PLL connector receptacle 4 connects to FPGA 51 so as to provide a PTP clock, synchronous Ethernet (SynchE clk) clock, and 1 PPS clock output to FPGA 51 and receive a recovered clock signal (Rec_clk) from FPGA 51. PLL connector 6 connects to FPGA 51 so as to provide PTP clock, synchronous Ethernet (SynchE clk) clock, and 1 PPS clock output to FPGA 51 and receive a recovered clock signal (REC_Clk) from FPGA 51.

PLL-timed PHY 11, 12 in FIG. 5 may be PLL-timed Ethernet devices such as Ethernet switches that can be driven from a free run clock or Synchronous Ethernet and can receive Precision Time Protocol (PTP) input, and 1 pulse-per-second (1 PPS) or sync pulses (e.g., 400 Hz) to align with PTO time, and may each generate a recovered clock signal (Rec_clk) that is coupled to one of PLL timing devices 21-22.

In the present embodiment FPGA 51 includes control logic in conformance with the IEEE 1588 specification, Version 2, by the Institute for Electrical and Electronics Engineers (IEEE) for operation as IEEE 1588 timing devices. In one embodiment PLL timing devices 21-22 generate clock output (e.g., 1PPS and either ITU-T G.8263 or ITU-T G.8273.2 clock output) that is coupled to the IEEE 1588 control logic of FPGA 51 such that FPGA 51 operates as one or more IEEE 1588 clocks. In one embodiment one or more of FPGA 51 includes logic coupled to serial interfaces that generate Digitally Controlled Oscillator (DCO) or phase control signals that are coupled to the PLL timing devices 21-22 inserted in connector receptacles 4-5.

In the present embodiment PLL-timed PHYs 11-12 are SynchE and IEEE 1588 capable devices that conform to the ITU-T G.8262 and ITU-T G.8273.2 specification. In this embodiment FPGA 51 provides the message protocol of the network to control and monitor clock synchronization and in the present embodiment the protocol for these messages complies with the ITU-T G.8264 standard. FPGA 51 may be, for example, a STRATIX V FPGA by Altera Inc. of San Jose, Calif., that is used in conjunction with a PLL timing device 21-22 that can be a Synchronous Equipment Timing Source (SETS) for 1G, 10G, 40G, or 100G SynchE (e.g., an IDT-82P33731 SETS device or an IDT-82P33832 SETS device manufactured by Integrated Device Technology, Inc. of San Jose, Calif.). The SETS device acts as an Ethernet Equipment Clock source for the FPGA, and performs clock cleanup, advanced clock monitoring, and switchover functions.

Figure 6:
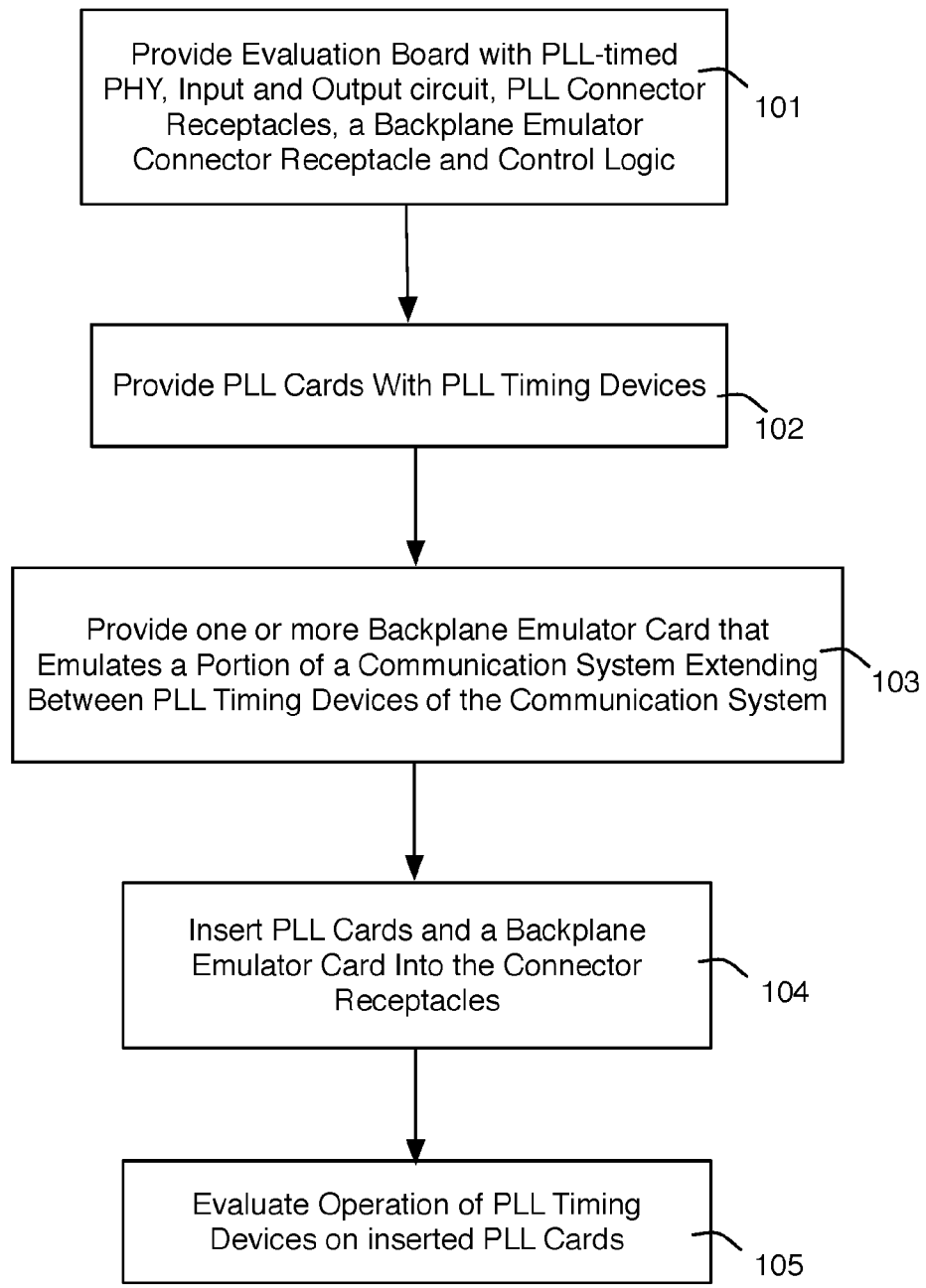
FIG. 6 illustrates a method for evaluating PLL timing devices, according to embodiments of the invention.

FIG. 6 illustrates a method 100 for demonstrating phase locked loop timing devices that can be used in a communication system. An evaluation board is provided 101 that includes a PLL-timed PHY, an input and output circuit, PLL connector receptacles, a backplane emulator connector receptacle and control logic. In the embodiment shown in FIGS. 1-6 evaluation boards 16 or 16a can be provided.

Phase locked loop (PLL) cards are provided 102 that are configured to be inserted into the PLL connector receptacles, with each PLL card including a PLL timing device to be evaluated. In embodiments of the present invention PLL cards 1-2 are provided. The provided PLL cards 1-2 include a PLL timing device 21-22 to be evaluated.

One or more backplane emulator card is provided 103 that is configured to be inserted into the backplane emulator connector receptacle. The backplane emulator card has electrical characteristics emulating a portion of a communication system extending between phase locked loop timing devices of the communication system that is being emulated. A Backplane emulator card 3 including a backplane emulator circuit 23 or a backplane emulator card including a configurable backplane emulator circuit 23a can be provided.

PLL cards and a backplane emulator card are inserted 104 into the connector receptacles to create a test platform that emulates portions of a communication system. PLL card 1 can be inserted into PLL connector receptacle 4 and PLL card 5 can be inserted into a PLL connector receptacle 5 and PLL card 3 can be inserted into a backplane emulator connector receptacle 6. Some or all of control logic 7-8 and PLL-timed PHYs on the evaluation board are identical to the physical devices used in the customer's communication system. Also, they have the same configurations as the customer uses or is going to use in their communication system. Though the method and apparatus is described as having identical physical devices to those used in the customer's communication systems, it is appreciated that it is often difficult to get identical semiconductor devices and that there may be variance in manufacturing processes between different production runs of a particular semiconductor device. Accordingly, the physical devices that are used are as close as possible to those of the customer's system, and may be the same manufacturer, the same type, the same model number or part number, and also are preferably the same production run or batch as the devices in the customer's communication system. Accordingly, the evaluation board emulates portions of the customer's communication system with the exception that it includes the PLL timing devices 21-22 to be evaluated.

Operation of the PLL timing devices on the inserted PLL cards is evaluated 105. In one embodiment step 105 includes coupling the evaluation board 16 or 16a, to one or more testing device 15 that may be, for example a personal computer (PC) on which one or more software program is running, and operating the testing device 15 so as to create images on a display of the testing device 15 or create digital files indicating properties of system 10, 30. Step 105 may include performing various tests that demonstrate the operation of the connected PLL timing devices 21-22 and the test results may be displayed on the display of the testing device 15 or may be stored in memory storage of the testing device 15 or printed out by a printer coupled to testing device 15.

Step 105 may include inserting different PLL cards and different backplane emulator cards into connector receptacles of the evaluation board 16, 16a to emulate different timing device configurations of the communication system and different backplane busses.

Step 105 can include testing of the PLL timing devices on the inserted PLL cards and demonstration of the test results. When a backplane emulator card 3 is used having a configurable backplane emulator circuit 23a, demonstration and testing of different backplane characteristics is performed using the single backplane emulator card 3 and changing the configuration of the backplane emulator circuit 23a. This may be done by providing input from FPGA 51 to backplane emulator circuit 23a so as to change the electrical characteristics (e.g., the resistance) of backplane emulator circuit 23a.

Evaluation board 16a can be configured by programming FPGA 51 (e.g., through SFP sockets 52) to emulate a portion of a SynchE communication system and inserting a PLL card 1-2 having a PLL device 21-22 that operates as an Ethernet Equipment Clock Source into one of connector receptacles 4-5. In addition, by programming the FPGA to be configured to operate as a IEEE 1588 node (that may also be SynchE) and inserting a PLL card 1-2 having a PLL device 21-22 that operates as an IEEE 1588 Clock Source into one of connector receptacles 4-5, evaluation board 16a can be used to emulate a portion of an IEEE 1588 Precision Time Protocol (PTP) communication system. As IEEE 1588 PTP is often used in conjunction with SynchE in applications that need time and phase synchronization this allows for demonstration and testing of IEEE 1588 PTP communication systems and non-IEEE 1588 PTP SynchE communication systems using a single evaluation board 16a.

Following are several exemplary configurations and methods for evaluation of a timing fabric of a communication system that includes equipment for transporting voice, data and video over Carrier networks and that includes a timing card and a line card. It is to be understood that these embodiments are exemplary only and that there are numerous other possible configurations and methodologies.

First Exemplary Configuration—Timing Fabric for Communication System that Includes a Timing Card and a Line Card In one exemplary embodiment that will now be discussed with reference to the embodiment of FIG. 6, a timing card is emulated using a PLL timing device 21 (e.g., a SETS PLL that can be used in the timing card of the emulated communication system) that is inserted in PLL connector receptacle 4 and a line card is emulated using a PLL timing device 22 (e.g., a SETS PLL that can be used in a line card of the emulated communication system) that is inserted in PLL connector receptacle 5.

The T1/E1 circuit 65 is configured to have the characteristics of the T1/E1 Line Input Units (LIU) of the emulated timing card. This may be done by using a T1/E1 circuit 65 that includes the same type of integrated circuit device (e.g., the same model, part number or batch of LIU) as the LIU of the emulated communication system (e.g., an identical T1/E1 transceiver integrated circuit device). T1/E1 emulation circuit 65 receives external Building Integrated Timing Supply (BITS)/Synchronization Supply Unit (SSU) through BITS/SSU connector receptacle 61 that are sent to PLL timing device 21 that is operable to generate standards-compliant clocks which are output from PLL connector receptacle 5 to backplane emulator connector receptacle 4 and pass through the backplane emulator card 3 inserted in backplane emulator connector receptacle 6 and are then output to other circuitry on evaluation board 16a through the PLL card 2 installed in PLL connector 5.

The line card is emulated by using a evaluation board 16a having one or more PLL-timed PHY 11-12 that is identical to the physical devices used in the line card of the emulated communication system. In the present example, PLL-timed PHY 11 is identical to the integrated circuit device in the line card of the emulated communication system. PLL-timed PHY 11 receives external input through Ethernet connector receptacles 57 and generates recovered clock signals that are sent to PLL timing device 22 through PLL connector 4. FPGA 51 includes Ethernet logic that can receive input through SFP sockets 52 and generate one or more recovered clock signal that is coupled to the PLL timing device 22 used in the demonstration. Other input can also be coupled to the PLL timing device 22 used to emulate the line card such as, for example, recovered clocks from one of T1/E1 circuits 65-66 and external clock input coupled through oscillator input connector receptacles 57 and oscillator output selector 13-14.

Timing device 22 is operable upon receiving the recovered clock signals to generate standards-compliant clocks (e.g., by rate converting the recovered clock to the backplane frequency that may be, for example, 8 kHz, 19.44 MHz, or 25 MHz). The output clock signal from PLL timing device is output from PLL connector receptacle 4 to FPGA 51 and to backplane emulator connector receptacle 6 where they pass through the backplane emulation circuit 23, 23a installed in backplane emulator connector receptacle 6 before going to the PLL timing device 21 installed in PLL connector receptacle 5.

Depending on the number of PHY reference clocks required on the line card, a discrete fan-out buffer may be required, in which event the other devices 26 include a fan-out buffer identical to or similar to the fan-out buffer in the line card being emulated.

In embodiments of the present invention one PLL timing device 21-22 is configured as a PLL of a timing card of the emulated communication system and the other timing device 21-22 is configured as a PLL timing device 21-22 of a line card of the emulated communication system, with the backplane emulator circuit 23, 23a that extends between them emulating the electrical characteristics of the backplane of the emulated circuit. Since PLL-timed PHY 11 of demonstration board 6a is different from PLL-timed PHY 12, two different configurations of line card can be emulated simply by switching the PLL card 1-2 emulating the timing card with the PLL timing device 21-22 emulating the line card. Also, different configurations of line cards can be evaluated by reprogramming FPGA 51, or providing different input to transceivers of FPGA 51.

In some communication systems the functionality of the timing card and the line card are merged onto a single card (e.g., an up-link transmission card). The method and apparatus of the present invention is configured for emulating this type of timing fabric as well. In one exemplary embodiment one or more of timing devices 21-22 is a (SETS) PLL that can be used in a up-link transmission card of the emulated communication system, and evaluation board 16a is configured to be in compliance with the synchronization standards of the up-link transmission card and includes an identical PLL-timed PHY to the one used on the up-link transmission card to be emulated. During step 105 the PLL-timed PHY 11-12 receives external input through Ethernet connector receptacles 54-55 and generate recovered clock signals that are sent to PLL timing device 21-22 through PLL connector 4-5, with timing devices 21-22 operable for filtering, frequency translation and generation of backplane clock signals that are output to other circuitry on evaluation board 16a through PLL connector receptacles 4-5 and the backplane emulator circuit 23, 23a in backplane emulator connector receptacle 6.

More particularly, when a PLL card 1 that includes a PLL timing device 21 is emulating the up-link transmission card, PLL-timed PHY 11 receives external input through Ethernet connector receptacles 54 and generates recovered clock signals that are sent to PLL timing device 21 through PLL connector 4, with timing device 21 operable to generate standards-compliant clocks that are output from PLL connector receptacle 4 to backplane emulator connector receptacle 6 where they pass through the backplane emulation circuit 23, 23a installed in backplane emulator connector receptacle 6 before going to the PLL timing device 21 installed in PLL connector receptacle 5. Similarly, when a PLL card 2 that includes a PLL timing device 22 is emulating the up-link transmission card, PLL-timed PHY 12 receives external input through Ethernet connector receptacles 55 and generates recovered clock signals that are sent to PLL timing device 22 through PLL connector 5, with timing device 22 operable to generate standards-compliant clocks that are output from PLL connector receptacle 5 to backplane emulator connector receptacle 6 where they pass through the emulation circuit 23, 23a installed in backplane emulator connector receptacle 6 before going to the PLL timing device 22 installed in PLL connector receptacle 4.

When one PLL timing device 21-22 is configured as a PLL of a up-link transmission Card of the emulated communication system, the other timing device 21-22 can be configured as a PLL of a line card of the emulated communication system (e.g., a line card including a DSL or PON PLL-timed PHY), with the backplane emulator circuit 23 that extends between them emulating the electrical characteristics of the backplane of the communication system that is being emulated. Since PLL-timed PHY 11 of evaluation board 6a is different from PLL-timed PHY 12, two different configurations of line card can be emulated simply by switching the PLL timing device 21-22 emulating the Up-Link Transmission Card and the PLL timing device 21-22 emulating the line card.

It is to be understood that the above exemplary embodiments are only a few of the possible configurations of the present invention and that other configurations can be used for demonstration and testing of the same or different communication systems.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Testing device 15 may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

Though evaluation board 16 is shown in FIGS. 1, 3 and 5 to include oscillator input selectors 13-14 that select timing input to be sent to the PLL to input and output circuit 9, it is appreciated that any of a number of different other configurations can be used for providing external timing input to PLL timing devices 21-22. In one embodiment evaluation board 16, 16a does not include oscillator input selectors 13-14 and reference clock input is coupled directly from input and output circuit 9 to a connector receptacle 4-5.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method for evaluating Phase Locked Loop (PLL) timing devices comprising:
   providing an evaluation board including a PLL-timed physical device, an input and output circuit, connector receptacles and control logic;
   providing PLL cards configured to be inserted into at least two of the connector receptacles, each of the PLL cards including a PLL timing device;
   providing one or more backplane emulator card configured to be inserted into one of the connector receptacles, the backplane emulator card having electrical characteristics emulating a portion of a communication system extending between phase locked loop timing devices of the communication system; and
   wherein different PLL cards and different backplane emulator cards can be coupled to the connector receptacles to emulate different configurations of the communication system.

2. The method of claim 1 wherein each of the PLL-timed physical devices are Ethernet devices configured to receive a synchronous Ethernet clock from one of the PLL cards and output a corresponding recovered clock signal.

3. The method of claim 1 further comprising:
   inserting two of the PLL cards into a first connector receptacle and a second connector receptacle of the plurality of connector receptacles; and
   inserting a backplane emulator card into a third connector receptacles of the plurality of connector receptacles that is electrically coupled in series between the first connector receptacle and the second connector receptacle.

4. The method of claim 3 further comprising evaluating the PLL timing devices on the inserted PLL cards, the evaluating including operating the PLL timing devices on the inserted PLL cards such that the PLL timing devices on the inserted PLL cards couple timing signals through the inserted backplane emulator card.

5. The method of claim 4 further comprising programming a PLL-timed physical device of the plurality of PLL-timed physical devices that is a field programmable gate array (FPGA) to include IEEE 1588 logic.

6. The method of claim 4 further comprising programming the FPGA to include synchronous Ethernet logic so that the FPGA can function as a synchronous Ethernet device and an IEEE 1588 device.

7. An evaluation board comprising:
a circuit board;
an input and output circuit disposed on the circuit board;
control logic disposed on the circuit board and coupled to the input and output circuit;
a plurality of PLL-timed physical devices, where some of the PLL-timed physical devices are the same type of physical devices in a communication system, each of the plurality of PLL-timed physical devices coupled to the input and output circuit;
a first connector receptacle disposed on the circuit board and coupled to the control logic and to one or more of the PLL-timed physical devices, the first connector receptacle configured to receive a PLL card including a PLL timing device;
a second connector receptacle disposed on the circuit board and coupled to the control logic and to one or more of the PLL-timed physical devices, the second connector receptacle configured to receive a PLL card including a PLL timing device; and
a third connector receptacle coupled in series between the first connector receptacle and the second connector receptacle and configured to receive a backplane emulator card having electrical characteristics emulating a backplane of the communication system.

8. The evaluation board of claim 7 wherein the control logic further comprises an application specific integrated circuit device (ASIC) that is identical to an ASIC in the communication system.

9. The evaluation board of claim 7 wherein the control logic further comprises a field programmable gate array (FPGA) that is identical to a FPGA in the communication system.

10. The evaluation board of claim 9 further comprising a plurality of clock oscillator input connector receptacles for coupling external reference clock input to the first connector receptacle and the second connector receptacle.

11. The evaluation board of claim 10 further comprising:
a first clock oscillator selector coupled to each of the clock input connector receptacles and to the first connector receptacle for selecting the external reference clock input to the first connector receptacle; and
a second clock oscillator selector coupled to each of the clock input connector receptacles and to the second connector receptacle for selecting the external reference clock input to the second connector receptacle.

12. The evaluation board of claim 7 wherein the control logic further comprises a field programmable gate array (FPGA) that includes synchronous Ethernet logic and IEEE 1588 logic so that the FPGA can function as a synchronous Ethernet device and an IEEE 1588 device.

13. A system for evaluating PLL devices comprising:
a circuit board;
an input and output circuit disposed on the circuit board;
control logic disposed on the circuit board and coupled to the input and output circuit, the control logic including circuitry identical to control logic circuitry of a communication system that is being emulated;
a plurality of PLL-timed physical devices, where some of the PLL-timed physical devices are the same type of physical devices in the communication system, each of the plurality of PLL-timed physical devices coupled to the input and output circuit;
a first connector receptacle disposed on the circuit board and coupled to the control logic and to one or more of the PLL-timed physical devices;
a second connector receptacle disposed on the circuit board and coupled to the control logic and to one or more of the PLL-timed physical devices;
a plurality of phase locked loop (PLL) cards, each of the PLL cards including a PLL timing device that can be used in the communication system and including a card connector configured to be coupled to the first connector receptacle and the second connector receptacle;
a third connector receptacle coupled in series between the first connector receptacle and the second connector receptacle;
a backplane emulator card including a connector configured to be coupled to the third connector receptacle, the backplane emulator card having electrical characteristics emulating a backplane of the communication system; and
wherein ones of the plurality of PLL cards can be coupled to the first connector receptacle and to the second connector receptacle, and the backplane emulator card can be inserted into the third connector receptacle for evaluating different configurations of the communication system.

14. The system of claim 13 wherein the control logic further comprises Ethernet logic, the Ethernet logic configured to receive a synchronous Ethernet clock from a phase locked loop card disposed in the first connector receptacle and output a corresponding recovered clock signal to the phase locked loop card disposed in the first connector receptacle, and configured to receive a synchronous Ethernet clock from a phase locked loop card disposed in the second connector receptacle and output a corresponding recovered clock signal to the phase locked loop card disposed in the second connector receptacle.

15. The system of claim 14 further comprising:
a plurality of clock oscillator input connector receptacles for coupling external reference clock input to the first PLL connector receptacle and the second PLL connector receptacle;
a first clock oscillator selector coupled to each of the clock input connector receptacles and to the first PLL connector receptacle for selecting the external reference clock input to the first PLL connector receptacle; and
a second clock oscillator selector coupled to each of the clock input connector receptacles and to the second connector receptacle for selecting the external reference clock input to the second PLL connector receptacle.

16. The system of claim 14 wherein the control logic further comprises a field programmable gate array (FPGA) that includes IEEE 1588 logic and synchronous Ethernet logic.

17. The system of claim 13 further comprising a plurality of additional backplane emulator cards, each of the additional backplane emulator cards including circuitry emulating different electrical characteristics of a backplane of the emulated computer system.

18. The system of claim 17 wherein the control logic further comprises an application specific integrated circuit device (ASIC).

19. The system of claim 13 wherein the FPGA is electrically coupled to the third connector receptacle for controlling a configurable emulation circuit on the backplane emulator card, the configurable emulation circuit including selection circuitry that allows for selecting different electrical characteristics between connections between the PLL timing device coupled to the first connector receptacle and the PLL timing device coupled to the second connector receptacle.

20. The system of claim 19 wherein the configurable emulation circuit further comprises a first line driver, a second line driver and a switch coupled to the first line driver and the second line driver, the switch, the first line driver and the second line driver coupled between a connection to the PLL card coupled to the first connector receptacle and a corresponding connection to the PLL card coupled to the second connector receptacle so that either the first line driver or the second line driver is coupled between connections to the PLL card coupled to the first connector receptacle and corresponding connections to the PLL card coupled to the second connector receptacle.

* * * * *